US012712425B1

(12) United States Patent
Calisto et al.

(10) Patent No.: US 12,712,425 B1
(45) Date of Patent: Aug. 18, 2026

(54) VOLTAGE REGULATOR CIRCUIT WITH UNDERSHOOT COMPENSATION

(71) Applicant: Apple Inc., Cupertino, CA (US)

(72) Inventors: Carlos Andre Faria Calisto, Swindon (GB); Francesco Griseta, Piansano (IT); Sarfraz Shaikh, Swindon (GB); Vincenzo Bisogno, Swindon (GB); Philip George Holliman, Swindon (GB)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 18/886,193

(22) Filed: Sep. 16, 2024

(51) Int. Cl.
*H02M 1/00* (2007.01)
*G05F 1/575* (2006.01)
*H02M 3/158* (2006.01)

(52) U.S. Cl.
CPC ......... *H02M 1/0016* (2021.05); *H02M 1/008* (2021.05); *H02M 3/158* (2013.01); *G05F 1/575* (2013.01); *H02M 3/1586* (2021.05)

(58) Field of Classification Search
CPC ...... H02M 1/008; H02M 3/156; H02M 3/158; H02M 3/1586; G05F 1/575
See application file for complete search history.

(56) References Cited

U.S. PATENT DOCUMENTS 8,519,691 B2 * 8/2013 McCloy-Stevens ........................ H02M 3/1588 323/287
9,882,480 B2 1/2018 Lee et al.
10,141,832 B2 11/2018 Vukadinovic et al.
10,491,003 B2 11/2019 Amin et al.
11,303,208 B2 4/2022 Du et al.
11,804,777 B2 10/2023 Chen et al.
2006/0176036 A1 * 8/2006 Flatness .............. H02M 3/1582 323/282
2008/0297122 A1 * 12/2008 Zhou ..................... H02M 3/156 323/222
2020/0389091 A1 * 12/2020 Chen ......................... G05F 1/62
2021/0367517 A1 * 11/2021 Lawrence ............... H02M 1/44
2022/0329147 A1 * 10/2022 Wen .................... H02M 1/0009
2022/0337162 A1 * 10/2022 Shen ......................... G06F 1/28
2023/0216409 A1 7/2023 Ravi et al.

* cited by examiner

*Primary Examiner* — Gary A Nash
(74) *Attorney, Agent, or Firm* — Sterne, Kessler, Goldstein & Fox P.L.L.C.

(57) ABSTRACT

The present disclosure describes a system with voltage undershoot compensation. The system can include a voltage regulator circuit and a detection circuit. The detection circuit can set the voltage regulator circuit in a valley current control mode of operation during a first steady state current drawn by one of more electronic circuits coupled to the voltage regulator circuit. The detection circuit can also set the voltage regulator circuit in a peak current control mode of operation during a transient current between the first steady state current and a second steady state current drawn by the one or more electronic circuits, in response to a load voltage provided by the voltage regulator circuit falling below a predetermined voltage level. The detection circuit can further set the voltage regulator circuit in the valley current control mode of operation after the second steady state current has been reached.

20 Claims, 6 Drawing Sheets

VOLTAGE REGULATOR CIRCUIT WITH UNDERSHOOT COMPENSATION

FIELD

This disclosure relates to a voltage regulator circuit and, more particularly, to a voltage regulator circuit with undershoot compensation.

BACKGROUND

Voltage regulator circuits generate a stable output voltage within a range compatible with electronic circuits electrically connected to them. A type of voltage regulator circuit is a DC-to-DC (DC-DC) voltage converter, which converts a source of direct current (DC), such as a battery, from one voltage level to another. There are two types of DC-DC voltage converters: linear and switched. A linear DC-DC voltage converter uses a linear circuit element, such as a resistor, to regulate an output load. A switched DC-DC voltage converter uses a switching circuit element, such as a switching transistor, to provide a pulsed voltage output to the output load. The pulsed voltage output can be smoothed using capacitors, inductors, and/or other suitable circuit elements.

SUMMARY

Embodiments of the present disclosure include a power management system. The power management system includes a voltage regulator circuit and a detection circuit. The detection circuit is configured to set the voltage regulator circuit in a valley current control mode of operation during a first steady state current drawn by one or more electronic circuits coupled to the voltage regulator circuit. The detection circuit is also configured to set the voltage regulator circuit in a peak current control mode of operation during a transient current between the first steady state current and a second steady state current drawn by the one or more electronic circuits, in response to a load voltage provided by the voltage regulator circuit falling below a predetermined voltage level. Further, the detection circuit is configured to set the voltage regulator circuit in the valley current control mode of operation after the second steady state current has been reached.

Embodiments of the present disclosure include a device having one or more electronic circuits and a power management system coupled to the one or more electronic circuits. The power management system includes voltage regulator circuits and a current control detection circuit. The current control detection circuit is configured to set the voltage regulator circuits in a valley current control mode of operation during a first steady state current drawn by the one or more electronic circuits, where the voltage regulator circuits operate at a substantially constant switching frequency and are phased to be active at spaced intervals during the valley current control mode of operation. The current control detection circuit is also configured to set the voltage regulator circuits in a peak current control mode of operation during a transient current between the first steady state current and a second steady state current drawn by the one or more electronic circuits, in response to a load voltage provided by the voltage regulator circuits falling below a predetermined voltage level, where the voltage regulator circuits pass a power supply source to the one or more electronic circuits during the peak current control mode of operation. The current control detection circuit is further configured to set the voltage regulator circuits in the valley current control mode of operation after the second steady state current has been reached, where the voltage regulator circuits operate at the substantially constant switching frequency and are phased to be active at the spaced intervals during the valley current control mode of operation.

Embodiments of the present disclosure include a method for mitigating (or compensating for) a voltage undershoot in a power management system. The method includes operating a voltage regulator circuit in a valley current control mode of operation to provide a first steady state current, in response to an output voltage of the voltage regulator circuit staying above a predetermined voltage level. The method also includes monitoring the output voltage to determine whether the output voltage falls below the predetermined voltage level due to a load current drawn by one or more electronic circuits coupled to the voltage regulator circuit. In response to the output voltage falling below the predetermined voltage level, the method includes transitioning the voltage regulator circuit from a valley current control mode of operation to a peak current control mode of operation. The method further includes monitoring a transient current of the voltage regulator circuit during the peak current control mode of operation. In response to the transient current reaching an upper value of a limit current, the method includes transitioning the voltage regulator circuit from the peak current control mode of operation to the valley current control mode of operation. Further, the method includes operating the voltage regulator circuit in the valley current control mode of operation to provide a second steady state current, after the transient current reaches the upper value of the limit current.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

Illustrative embodiments will now be described with reference to the accompanying drawings. In the drawings, like reference numerals generally indicate identical, functionally similar, and/or structurally similar elements.

DETAILED DESCRIPTION

Figure 1:
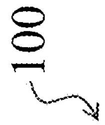
FIG. 1 is an illustration of an electronic device, according to some embodiments.
Figure 1:
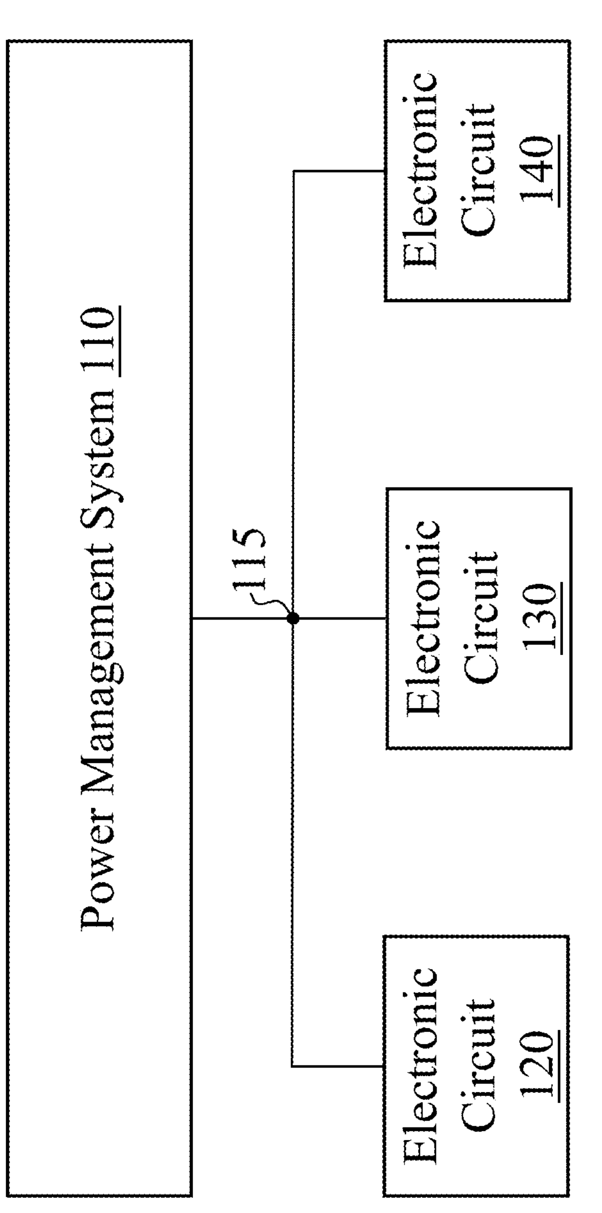

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

It is noted that references in the specification to "one embodiment," "an embodiment," "an example embodiment," and "exemplary" indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

In some embodiments, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

It is to be understood that the phraseology or terminology herein is for the purpose of description and not of limitation, such that the terminology or phraseology of the present specification is to be interpreted by those skilled in relevant art(s) in light of the teachings herein.

The following disclosure describes aspects of a power management system with voltage undershoot compensation. In some embodiments, the power management system can include a voltage regulator circuit (e.g., a switched DC-DC voltage converter) and a current control detection circuit. The current control detection circuit can set the voltage regulator circuit in a valley current control mode of operation during a first steady state current drawn by one of more electronic circuits coupled to the voltage regulator circuit. The current control detection circuit can also set the voltage regulator circuit in a peak current control mode of operation during a transient current between the first steady state current and a second steady state current drawn by the one or more electronic circuits (e.g., a higher steady state current than the first steady state current), in response to a load voltage provided by the voltage regulator circuit falling below a predetermined voltage level. The current control detection circuit can further set the voltage regulator circuit in the valley current control mode of operation after the second steady state current has been reached. A benefit of operating the voltage regulator circuit in the peak current control mode of operation during the transient current, among others, is that a voltage undershoot at an output of the voltage regulator circuit—e.g., due to a surge in load current by the one or more electronic circuits—can be mitigated (or compensated for), thus allowing the power management system to reach a steady state mode of operation more quickly.

FIG. 1 is an illustration of an electronic device 100, according to some embodiments. Electronic device 100 includes a power management system 110 and electronic circuits 120, 130, and 140. Power management system 110 can convert a source of incoming power (e.g., a battery or any other suitable power supply source) to desired voltages/currents required by electronic circuits 120, 130, and 140. In some embodiments, power management system 110 provides a supply voltage 115 to electronic circuits 120, 130, and 140 and regulates supply voltage 115 as electronic circuits 120, 130, and 140 vary in voltage and/or current consumption (also referred to herein as a "load voltage" and "load current" or cumulatively as a "load"). Supply voltage 115 can be set at a suitable voltage level for electronic circuits 120, 130, and 140, such as a power supply voltage (e.g., 1.0 V, 1.2 V, 1.8 V, 2.4 V, 3.3 V, and 5.0 V). Though electronic device 100 shows power management system 110 with a single supply voltage 115 electrically connected to electronic circuits 120, 130, and 140, electronic device 100 is not limited to this circuit architecture. For example, power management system 110 can provide different supply voltages to one or more of electronic circuits 120, 130, and 140. These other circuit architectures are within the scope of the present disclosure.

Electronic circuits 120, 130, and 140 can be any suitable type of electronic device, such as a processor circuit, a memory circuit, an input/output (I/O) circuit, a peripheral circuit, and combinations thereof. In some embodiments, the processor circuit can include a general-purpose processor to perform computational operations, such as a central processing unit. The processor circuit can also include other types of processing units, such as a graphics processing unit, an application-specific circuit, and a field-programmable gate array circuit. In some embodiments, the memory circuit can include any suitable type of memory, such as Dynamic Random Access Memory, Static Random Access Memory, Read-Only Memory, Electrically Programmable Read-Only Memory, non-volatile memory, and combinations thereof.

In some embodiments, the I/O circuit can coordinate data transfer between one of electronic circuits 120, 130, and 140 (e.g., a processor circuit) and a peripheral circuit. The I/O circuit can implement a version of Universal Serial Bus protocol or IEEE 1394 (Firewire®) protocol, according to some embodiments. Further, in some embodiments, the I/O circuit can perform data processing to implement networking standards, such as an Ethernet (IEEE 802.3) networking standard. Examples of the peripheral circuit can include storage devices (e.g., magnetic or optical media-based storage devices, including hard drives, tape drives, CD drives, DVD drives, and any suitable storage device), audio processing systems, and any suitable type of peripheral circuit, according to some embodiments.

Figure 2:
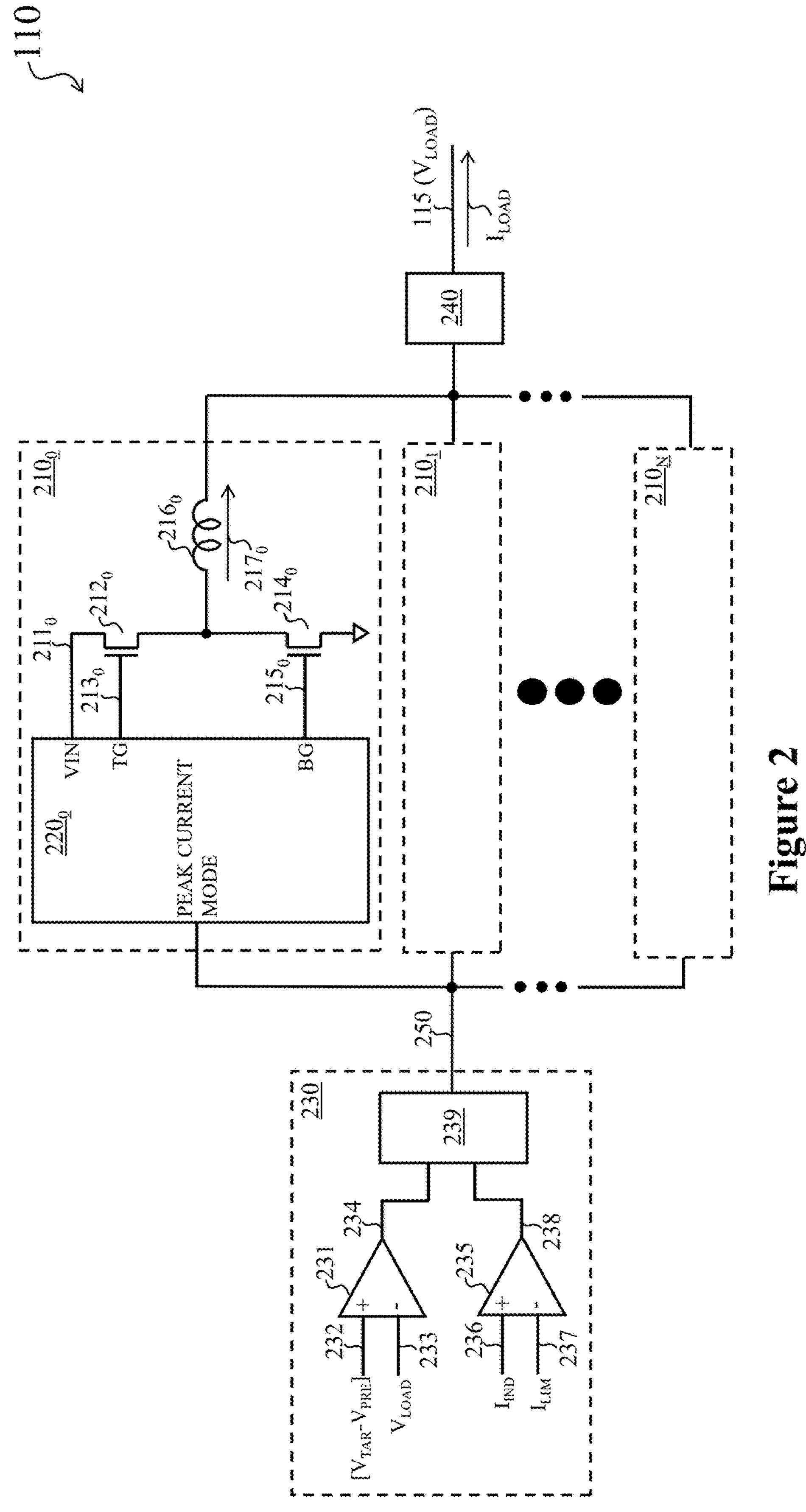
FIG. 2 is an illustration of a power management system, according to some embodiments.

FIG. 2 is an illustration of power management system 110, according to some embodiments. Power management system 110 includes voltage regulator circuits $\mathbf{210_0}$-$\mathbf{210_N}$ (where N is an integer greater than 1), a current control detection circuit 230, and a current detection circuit 240, according to some embodiments.

Voltage regulator circuits $\mathbf{210_0}$-$\mathbf{210_N}$ (also cumulatively referred to herein as "voltage regulator circuit 210") can operate as a multi-phase voltage converter to provide a load at supply voltage 115, according to some embodiments. In some embodiments, supply voltage 115 can be a power supply voltage to electronic circuits 120, 130, and 140 (of FIG. 1). The voltage level of supply voltage 115 can be at any suitable voltage level for electronic circuits 120, 130, and 140, such as about 1.0 V, about 1.2 V, about 1.8 V, about 2.4 V, about 3.3 V, and about 5.0 V. Due to the current drawn by one or more of electronic circuits 120, 130, and 140, the voltage level of supply voltage 115 can drop (or undershoot) below a predetermined voltage level that may affect an operating condition of one or more of electronic circuits 120, 130, and 140. For example, if a target voltage of supply voltage 115 is about 2.4 V and one or more of electronic circuits 120, 130, and 140 have a surge in load current, supply voltage 115 may drop below about 2.4 V (e.g., drop to about 2.0 V) such that the operating condition of one or more of electronic circuits 120, 130, and 140 can be adversely affected. Embodiments of the present disclosure mitigate (or compensate for) this voltage drop (or voltage undershoot) in supply voltage 115 due to the load current drawn by one or more of electronic circuits 120, 130, and 140.

As shown in FIG. 2, voltage regulator circuits $210_0$-$210_N$ can be arranged in a parallel configuration, where each voltage regulator circuit operates at a controlled duty cycle but are phased to be active at spaced intervals so that only one phase (e.g., one of voltage regulator circuits $210_0$-$210_N$) is active at any given time. Benefits of the parallel arrangement of voltage regulator circuits $210_0$-$210_N$, among others, include higher current capacity for electronic circuits 120, 130, and 140 (of FIG. 1), reduced voltage ripple at supply voltage 115, and improved transient response (e.g., due to a surge in load current by electronic circuits 120, 130, and 140).

In some embodiments, each of voltage regulator circuits $210_0$-$210_N$ can be a switched DC-DC voltage converter, such as a step-up voltage converter (e.g., a boost voltage converter), a step-down voltage converter (e.g., a buck voltage converter), or a step down/up voltage converter (e.g., a buck-boost voltage converter). The switched DC-DC voltage converter can include switching transistors controlled to activate and de-activate based on a current control mode of operation, according to some embodiments.

In some embodiments, when voltage regulator circuit 210 (e.g., each of voltage regulator circuits $210_0$-$210_N$ is a switched DC-DC voltage converter) is in a steady state mode of operation—e.g., a substantially constant amount of load current is drawn by electronic circuits 120, 130, and 140 (of FIG. 1)—the switching transistors are activated and deactivated at a substantially constant duty cycle such that voltage regulator circuit 210 operates at a substantially constant frequency based on a valley current control mode of operation. In some embodiments, when voltage regulator circuit 210 is in a transient mode of operation—e.g., a surge in load current drawn by one or more of electronic circuits 120, 130, and 140 lowers supply voltage 115 to a voltage level lower than a target voltage level of power management system 110—the switching transistors are activated and deactivated based on a peak current control mode of operation until another steady state mode of operation is reached by voltage regulator circuit 210 is reached. Put differently, in some embodiments, voltage regulator circuit 210 can operate in the valley current control mode of operation at steady state (e.g., when a substantially constant amount of current is drawn by electronic circuits 120, 130, and 140) and to operate in the peak current control mode of operation during a transient time period (e.g., when a surge in load current lowers supply voltage 115 to a voltage level lower than a target voltage level of power management system 110). A benefit, among others, of voltage regulator circuit 210 operating in the peak current control mode of operation during the transient time period is that a voltage undershoot of supply voltage 115 can be mitigated (or compensated for), thus allowing power management system 110 to reach steady state more quickly.

Each of voltage regulator circuits $210_0$-$210_N$ can have the same circuit architecture, according to some embodiments. For simplicity, the circuit architecture is only shown for voltage regulator circuit $210_0$ in FIG. 2. Voltage regulator circuit $210_0$ includes a power supply source $211_0$, a first switching transistor $212_0$, a second switching transistor $214_0$, an inductor $216_0$, and a switch controller $220_0$. In some embodiments, first switching transistor $212_0$ and second switching transistor $214_0$ can be n-type transistors, p-type transistors, or a combination thereof. In some embodiments, first switching transistor $212_0$ and second switching transistor $214_0$ can be metal-oxide-semiconductor (MOS) transistors, such metal-oxide semiconductor field-effect transistors (MOSFETs), fin field-effect transistors (FinFETs), gate-all-around field-effect transistors (GAAFETs), gallium nitride field effect transistors (GaNFETs), or any other suitable type of transistors. Power supply source $211_0$ can be a battery or any other suitable power supply source.

Switch controller $220_0$ activates and deactivates first switching transistor $212_0$ and second switching transistor $214_0$ based on a valley current control mode of operation during steady state and based on a peak current control mode of operation during a transient time period, according to some embodiments. For example, in the valley current control mode of operation during steady state, switch controller $220_0$ can provide pulses to turn on and off first switching transistor $212_0$ and second switching transistor $214_0$ at a substantially constant frequency (e.g., a fixed switching frequency)—via a signal line $213_0$ and a signal line $215_0$ electrically connected to a gate terminal of first switching transistor $212_0$ and a gate terminal of second switching transistor $214_0$, respectively—based on a steady state load required by electronic circuits 120, 130, and 140 (of FIG. 1). In some embodiments, during the valley current control mode of operation, an inductor current $217_0$ flowing through inductor $216_0$ can be monitored (e.g., by current detection circuit 240) during an off time of first switching transistor $212_0$, in which inductor current $217_0$ decreases during the off-time. At the end of a switching cycle (e.g., a duty cycle associated with turning on and turning off first switching transistor $212_0$ and second switching transistor $214_0$), the monitored inductor current $217_0$ can be compared to a valley current limit value. In some embodiments, the valley current limit value can be based on a current sensed through second switching transistor $214_0$ when second switching transistor $214_0$ is turned on.

With regard to the parallel configuration of voltage regulator circuits $210_0$-$210_N$, each of voltage regulator circuits $210_0$-$210_N$ can operate at substantially the same frequency (e.g., a substantially constant switching frequency) but phased to be active at spaced intervals so that only one of voltage regulator circuits $210_0$-$210_N$ is active at any given time. As discussed above, benefits of the parallel arrangement of voltage regulator circuits $210_0$-$210_N$, among others, include higher current capacity for electronic circuits 120, 130, and 140, reduced voltage ripple at supply voltage 115, and improved transient response (e.g., due to a surge in load current by electronic circuits 120, 130, and 140).

As the load requirement increases, the voltage level at supply voltage 115 can drop below a predetermined voltage level due to one or more of electronic circuits 120, 130, and 140 drawing additional load current. Referring to FIG. 2, in some embodiments, current control detection circuit 230 detects when supply voltage 115 drops below the predetermined voltage level. Current control detection circuit 230 includes a comparator circuit 231 and a control circuit 239.

In some embodiments, comparator circuit 231 receives an input 232 and an input 233. Input 232 receives a voltage level equal to a target voltage of voltage regulator circuits $210_0$-$210_N$ when no load current is drawn by electronic circuits 120, 130, and 140 (also referred to herein as "$V_{TAR}$") minus a predetermined voltage (also referred to herein as "$V_{PRE}$"). Put differently, input 232 receives a voltage level equal to [$V_{TAR}$−$V_{PRE}$]. In some embodiments, the voltage level of [$V_{TAR}$−$V_{PRE}$] can represent a voltage level at which voltage regulator circuits $210_0$-$210_N$ transition from the valley current control mode of operation to the peak current control mode of operation in response to a surge in load current being drawn by one or more of electronic circuits 120, 130, and 140. For example, the target voltage of voltage regulator circuit $210_0$-$210_N$ when no load is drawn by electronic circuits 120, 130, and 140 can be about 2.4 V (e.g., $V_{TAR}$=2.4 V) and the predetermined voltage can be about 0.4 V (e.g., $V_{PRE}$=0.4 V). In some embodiments, the value of $V_{PRE}$ can be based on a total variation allowed on supply voltage 115 for a given application. For example, the total variation allowed on supply voltage 115 can depend on an output load capacitance and/or maximum load requirements. If the output of voltage regulator circuits $210_0$-$210_N$ (e.g., supply voltage 115) falls below [$V_{TAR}$−$V_{PRE}$], the operating condition of one or more of electronic circuits 120, 130, and 140 can be adversely affected. To mitigate (or compensate for) the voltage undershoot at the output of voltage regulator circuits $210_0$-$210_N$, voltage regulator circuits $210_0$-$210_N$ operate in the peak current control mode of operation to allow power management system 110 to reach a steady state load current more quickly.

Referring to comparator circuit 231 in FIG. 2, input 233 receives a voltage level of supply voltage 115 (also referred to herein as "$V_{LOAD}$"), which can be provided by current detection circuit 240. In some embodiments, current detection circuit 240 monitors a voltage level at supply voltage 115 ($V_{LOAD}$) and a load current (also referred to herein as "$I_{LOAD}$") drawn by one or more of electronic circuits 120, 130, and 140 at supply voltage 115. Comparator circuit 231 compares the voltage level at input 233 to the voltage level at input 232 and, if $V_{LOAD}$ falls below [$V_{TAR}$−$V_{PRE}$], indicates to control circuit 239, via a control signal line 234, to set one or more voltage regulator circuits $210_0$-$210_N$ in the peak current control mode of operation, according to some embodiments.

In response to receiving the indication that $V_{LOAD}$ is below [$V_{TAR}$−$V_{PRE}$], control circuit 239 sends an enable "peak current mode" signal to voltage regulator circuits $210_0$-$210_N$ via a control signal line 250. In some embodiments, when the peak current mode signal is enabled, all of voltage regulator circuits $210_0$-$210_N$ transition from the valley current control mode operation to the peak current control mode of operation.

Referring to FIG. 2, in response to receiving the enabled peak current mode signal via control signal line 250, switch controller $220_0$ can control first switching transistor $212_0$ and second switching transistor $214_0$ to be in the peak current control mode of operation during a transition from a steady state load current to a higher steady state load current (e.g., transient load current), according to some embodiments. During the peak current control mode of operation, switch controller $220_0$ turns off second switching transistor $214_0$ and turns on first switching transistor $212_0$ for a period of time until the higher steady state load current is provided by voltage regulator circuit $210_0$ (and one or more of the other voltage regulator circuits $210_1$-$210_N$). During this period of time, a transient load current—e.g., inductor current $217_0$ flowing through inductor $216_0$—to one or more of electronic circuits 120, 130, and 140 is provided by power supply source $211_0$ via first switching transistor $212_0$.

With regard to the parallel configuration of voltage regulator circuits $210_0$-$210_N$, each of voltage regulator circuits $210_0$-$210_N$ can turn off their respective second switching transistor 214 and turn on their respective first switching transistor 212 during the peak current control mode of operation, according to some embodiments. In some embodiments, all of voltage regulator circuits $210_0$-$210_N$ can turn on their respective first switching transistor 212—thereby passing power supply source 211—at the same time during the peak current control mode of operation as voltage regulator circuits $210_0$-$210_N$ provide the transient load current to one or more of electronic circuits 120, 130, and 140. A benefit of voltage regulator circuits $210_0$-$210_N$ operating in the peak current control mode of operation at the same time, among others, is that a voltage undershoot of supply voltage 115 (e.g., due to one or more of electronic circuits 120, 130, and 140 drawing a surge in load current) can be mitigated (or compensated for), thus allowing power management system 110 to reach the higher steady state load current more quickly.

Referring to FIG. 2, in some embodiments, current control detection circuit 230 detects when the higher steady state load current has been reached and provided by voltage regulator circuits $210_0$-$210_N$. Current control detection circuit 230 includes a comparator circuit 235 and control circuit 239.

In some embodiments, comparator circuit 235 receives an input 236 and an input 237. Input 236 receives a current level of inductor current 217 (also referred to herein as "$I_{IND}$"). Input 237 receives a current level of a limit current (also referred to herein as "$I_{LIM}$"). For example, during the valley current control mode of operation, $I_{LIM}$ can be a fixed steady state offset current level above a peak current level provided by voltage regulator circuits $210_0$-$210_N$. The fixed steady state offset current level can be based on one or more of an output load capacitance, load current, and transient dynamics of voltage regulator circuits $210_0$-$210_N$. During the peak current control mode of operation, $I_{LIM}$ can track a current representation of $V_{LOAD}$ until the higher steady state load current is reached, according to some embodiments. For example, the current representation of $V_{LOAD}$ can be $V_{LOAD}$ converted into an equivalent inductor current 217, where in steady state, the equivalent inductor current 217 is equal to $V_{LOAD}\cdot K$. The value of K can represent a time ratio of the on time ($t_{ON}$) to a total period ($t_{ON}+t_{OFF}$) of voltage regulator circuits $210_0$-$210_N$ (e.g., K=[$t_{ON}$]/[$t_{ON}+t_{OFF}$]). In some embodiments, current detection circuit 240 monitors the higher steady state load current ($I_{LOAD}$). In some embodiments, current detection circuit 240 monitors inductor current 217. Also, in some embodiments, an upper value of $I_{LIM}$ can be set to a predetermined value higher than the higher steady state load current but below a maximum current level provided by voltage regulator circuits $210_0$-$210_N$ to prevent damage to power management system 110 (e.g., to protect one or more of first switching transistors 212, second switching transistors 214, and inductors 216). Comparator circuit 235 compares the current level at input 237 to the current level at input 236 and, if inductor current 217 reaches the upper value of $I_{LIM}$, indicates to control circuit 239, via a control signal line 238, to transition voltage regulator circuits $210_0$-$210_N$ from the peak current control mode of operation to the valley current control mode of operation.

In response to receiving the indication that inductor current 217 reached the upper value of $I_{LIM}$, control circuit 239 sends a disable "peak current mode" signal to voltage regulator circuits $210_0$-$210_N$ via control signal line 250. In some embodiments, when the peak current mode signal is disabled, all of voltage regulator circuits $210_0$-$210_N$ transition from the peak current control mode of operation to the valley current control mode of operation. As discussed above, during the valley control mode of operation, voltage regulator circuits $210_0$-$210_N$ can operate at substantially the same frequency (e.g., at a substantially constant switching frequency) but phased to be active at spaced intervals so that only one of voltage regulator circuits $210_0$-$210_N$ is active at any given time.

Figure 3:
FIG. 3 is an illustration of a waveform showing an operation of a power management system, according to some embodiments.
Figure 3:
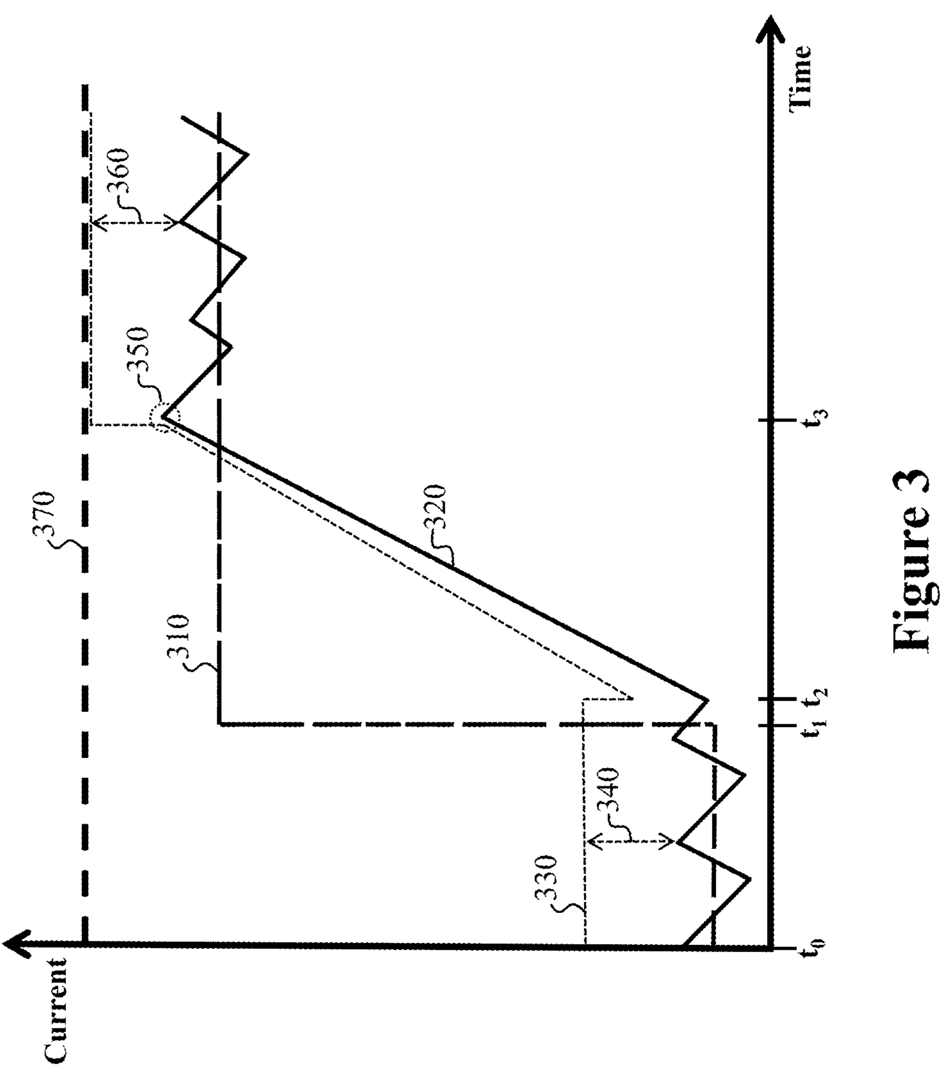

FIG. 3 is an illustration of waveform 300 showing an operation of power management system 110, according to some embodiments. Waveform 300 shows an example behavior of power management system 110 in response to an increase in a load current 310 over time. The curvatures in waveform 300 are exemplary and for illustration purposes; this waveform may include different curvatures. The following description of waveform 300 refers to power management system 110 in FIGS. 1 and 2.

During a time period from time to $t_0$ time $t_1$, power management system 110 is in a steady state mode of operation with a steady state load current. The steady state load current drawn by one or more electronic circuit 120, 130, and 140 (e.g., $I_{LOAD}$) is represented by a waveform 310. During this time period, one or more of voltage regulator circuits $210_0$-$210_N$ in power management system 110 operate in a valley current control mode of operation, where first switching transistors 212 and second switching transistors 214 are activated and deactivated at a substantially constant duty cycle (or substantially constant frequency). The cyclic nature of first switching transistors 212 and second switching transistors 214 are shown by a waveform 320, which represents a current flowing through an inductor (e.g., inductor current 217) in one or more of voltage regulator circuits $210_0$-$210_N$.

Also, during the time period from time to $t_0$ time $t_1$, a limit current ($I_{LIM}$) is represented by a waveform 330. Here, $I_{LIM}$ is at a fixed steady state offset current level 340 above a peak current level of the inductor current (e.g., inductor current 217) represented by waveform 320. In some embodiments, the limit current ($I_{LIM}$) represents a maximum current provided by voltage regulator circuits $210_0$-$210_N$ at a particular voltage level of supply voltage 115 ($V_{LOAD}$) to prevent damage to power management system 110 (e.g., to protect one or more of first switching transistors 212, second switching transistors 214, and inductors 216). For example, without $I_{LIM}$ set to a maximum current value, voltage regulator circuits $210_0$-$210_N$ would source excessive load current, which may compromise the durability and reliability of their transistors (e.g., first switching transistors 212 and second switching transistors 214).

Figure 4:
FIG. 4 is an illustration of another waveform showing an operation of a power management system, according to some embodiments.
Figure 4:
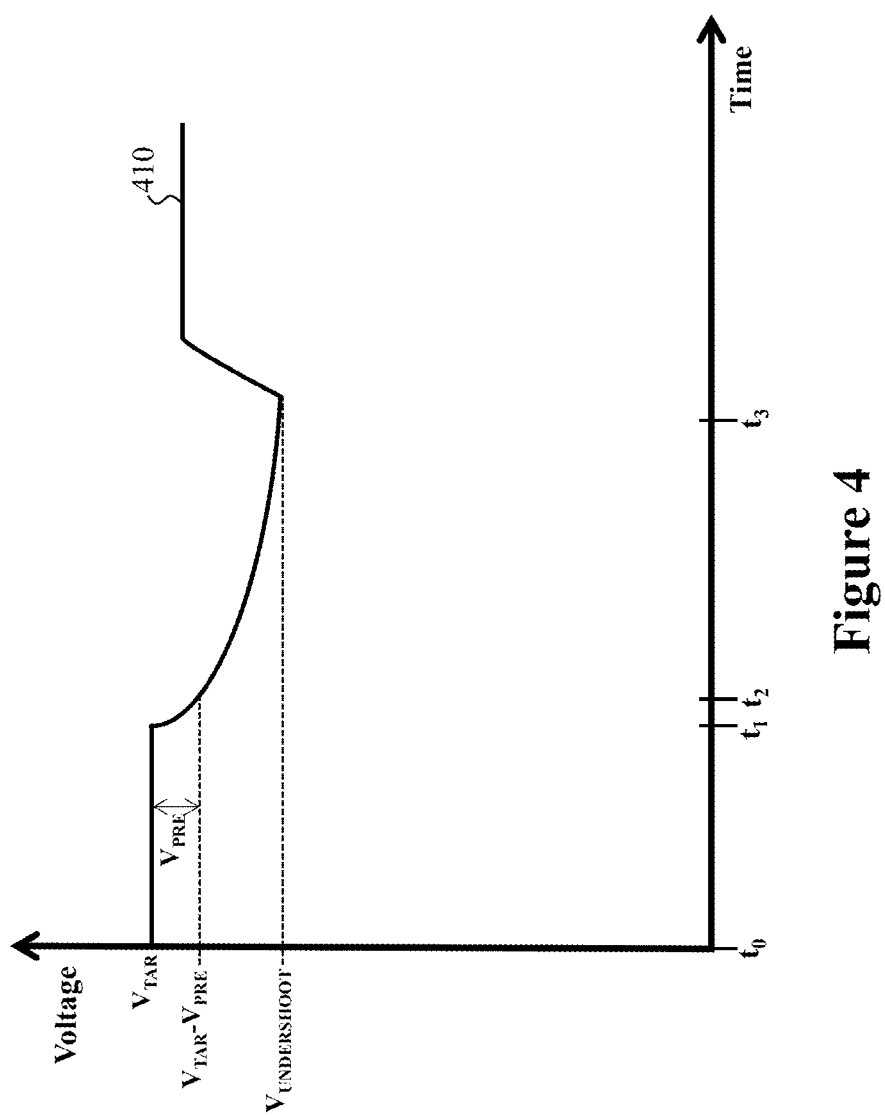

At time $t_1$, an increase in load current is drawn by one or more of electronic circuits 120, 130, and 140. This increase can be due, for example, an activation of internal circuits in one or more electronic circuits 120, 130, and 140 that causes a surge in load current at time $t_1$. As a result, the voltage level at supply voltage 115 can drop below a predetermined voltage level. FIG. 4 is an illustration of a waveform 410 showing a drop in voltage level of supply voltage 115 at time $t_1$, according to some embodiments. As shown in waveform 410, supply voltage 115 drops from $V_{TAR}$ (e.g., a voltage level equal to a target voltage of voltage regulator circuits $210_0$-$210_N$ when no load current is drawn by electronic circuits 120, 130, and 140) to the voltage level of $[V_{TAR}-V_{PRE}]$ at time $t_2$. In some embodiments, the voltage level of $[V_{TAR}-V_{PRE}]$ can represent a voltage level at which voltage regulator circuits $210_0$-$210_N$ transition from the valley current control mode of operation to the peak current control mode of operation in response to the surge in load current drawn by one or more of electronic circuits 120, 130, and 140.

Referring to FIG. 3, from time $t_2$ to time $t_3$, voltage regulator circuits $210_0$-$210_N$ in power management system 110 operate in the peak current control mode of operation, where second switching transistors 214 are turned off and first switching transistors 212 are turned on for a period of time until a higher steady state load current is provided by power management system 110. During this period of time, a transient load current—e.g., inductor currents 217 flowing through inductors 216 in voltage regulator circuits $210_0$-$210_N$—to one or more of electronic circuits 120, 130, and 140 is provided by power supply sources 211 via first switching transistors 212 in voltage regulator circuits $210_0$-$210_N$ at the same time, according to some embodiments. During the peak current control mode of operation, $I_{LIM}$ can track a current representation of $V_{LOAD}$ (e.g., $V_{LOAD}$ converted into an equivalent inductor current 217, as discussed above) until the higher steady state load current (e.g., monitored by current detection circuit 240) is reached, according to some embodiments. For example, as shown in FIG. 3, $I_{LIM}$ (as represented by waveform 330) increases as the inductor current (as represented by waveform 320) increases during the time period from time $t_2$ to time $t_3$. Referring to FIG. 4, a benefit of voltage regulator circuits $210_0$-$210_N$ operating in the peak current control mode of operation at the same time, among others, is that a voltage undershoot of supply voltage 115 (also referred to herein as "$V_{UNDERSHOOT}$") can be mitigated (or compensated for), thus allowing power management system 110 to reach the higher steady state load current more quickly.

Referring to FIG. 3, at time $t_3$, an upper value 350 of $I_{LIM}$ can be set to a predetermined current level 360 below a maximum current level 370 provided by voltage regulator circuits $210_0$-$210_N$ at a particular voltage level of supply voltage 115 ($V_{LOAD}$) to prevent damage to power management system 110 (e.g., to protect one or more of first switching transistors 212, second switching transistors 214, and inductors 216). For example, without $I_{LIM}$ set to a maximum current value, voltage regulator circuits $210_0$-$210_N$ would source excessive load current, which may compromise the durability and reliability of their transistors (e.g., first switching transistors 212 and second switching transistors 214). Once inductor currents 217 (as represented by waveform 320) reaches upper value 350 of $I_{LIM}$, voltage regulator circuits $210_0$-$210_N$ transition from the peak current control mode of operation to the valley current control mode of operation, as shown by the cyclic nature of first switching transistors 212 and second switching transistors 214 in waveform 320 after time $t_3$. In turn, referring to FIG. 4, supply voltage 115 (as shown by waveform 410) reaches a steady state voltage level after time $t_3$.

Figure 5:
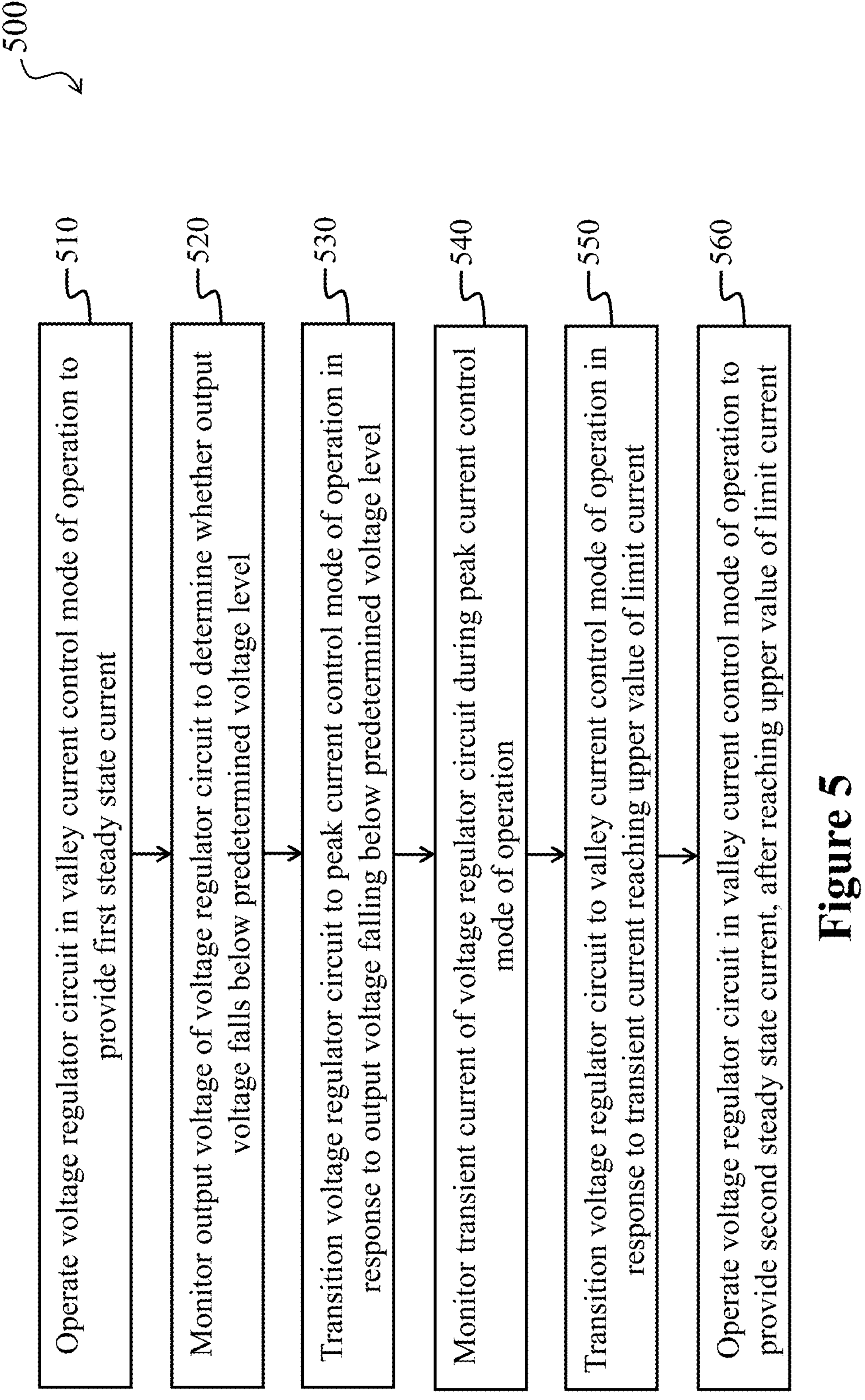
FIG. 5 is an illustration of a method for mitigating voltage undershoot in a power management system, according to some embodiments.

FIG. 5 is an illustration of a method 500 for mitigating (or compensating for) a voltage undershoot in a power management system, according to some embodiments. For illustrative purposes, the operations in method 500 will be described with reference to power management system 110 shown in FIGS. 1 and 2 and to the waveforms shown in FIGS. 3 and 4. Other representations of power management systems and associated waveforms are within the scope of the present disclosure. Also, additional operations may be performed between various operations of method 500 and may be omitted merely for clarity and ease of description. The additional operations can be provided before, during, and/or after method 500, in which one or more of these additional operations are briefly described herein. Moreover, not all operations may be needed to perform the disclosure provided herein. Additionally, some of the operations may be performed simultaneously or in a different order than shown in FIG. 5. In some embodiments, one or more other operations may be performed in addition to or in place of the presently-described operations.

At operation 510, a voltage regulator circuit operates in a valley current control mode of operation to provide a first steady state current. In some embodiments, the voltage regulator circuit operates in the valley current control mode of operation in response to an output voltage of the voltage regulator circuit staying above a predetermined voltage level. Referring to FIG. 2, one or more voltage regulator circuits 210$_0$-210$_N$ operate in the valley current control mode of operation to provide the first steady state current.

Referring to FIGS. 2 and 3, during the time period from time to $t_0$ time $t_1$, one or more of voltage regulator circuits 210$_0$-210$_N$ in power management system 110 operate in the valley current control mode of operation, where first switching transistors 212 and second switching transistors 214 are activated and deactivated at a substantially constant duty cycle (or substantially constant frequency). The cyclic nature of first switching transistors 212 and second switching transistors 214 are shown by waveform 320, which represents a current flowing through an inductor (e.g., inductor current 217) in one or more of voltage regulator circuits 210$_0$-210$_N$. Referring to FIG. 4, during the time period from time to $t_0$ time $t_1$, the output voltage of voltage regulator circuits 210$_0$-210$_N$—e.g., supply voltage 115 as represented by waveform 410—is above predetermined voltage $V_{PRE}$.

Referring to FIG. 5, at operation 520, the output voltage of the voltage regulator circuit is monitored to determine whether the output voltage falls below the predetermined voltage level. In some embodiments, the output voltage can fall below the predetermined voltage level due to a load current drawn by one or more electronic circuits coupled to the voltage regulator circuit. Referring to FIG. 2, current control detection circuit 230 monitors the output voltage of one or more voltage regulator circuits 210$_0$-210$_N$ to determine whether the output voltage falls below a predetermined voltage level (e.g., the voltage level of [$V_{TAR}$−$V_{PRE}$]). For example, comparator circuit 231 compares the voltage level at input 233 (the voltage level of $V_{LOAD}$) to the voltage level at input 232 (the voltage level of [$V_{TAR}$−$V_{PRE}$]).

Referring to FIG. 5, at operation 530, in response to the output voltage falling below the predetermined voltage level, the voltage regulator circuit transitions from the valley current control mode of operation to a peak current control mode of operation. Referring to FIG. 2, if $V_{LOAD}$ falls below [$V_{TAR}$−$V_{PRE}$], comparator circuit 231 indicates to control circuit 239, via control signal line 234, to set one or more voltage regulator circuits 210$_0$-210$_N$ in the peak current control mode of operation, according to some embodiments. In response to receiving the indication that $V_{LOAD}$ is below [$V_{TAR}$−$V_{PRE}$], control circuit 239 sends an enable "peak current mode" signal to voltage regulator circuits 210$_0$-210$_N$ via control signal line 250. In some embodiments, when the peak current mode signal is enabled, all of voltage regulator circuits 210$_0$-210$_N$ transition from the valley current control mode operation to the peak current control mode of operation.

Referring to FIGS. 2 and 4, as shown in waveform 410, supply voltage 115 drops from $V_{TAR}$ (e.g., a voltage level equal to a target voltage of voltage regulator circuits 210$_0$-210$_N$ when no load current is drawn by electronic circuits 120, 130, and 140) to the voltage level of [$V_{TAR}$−$V_{PRE}$] at time $t_2$. In some embodiments, the voltage level of [$V_{TAR}$−$V_{PRE}$] can represent a voltage level at which voltage regulator circuits 210$_0$-210$_N$ transition from the valley current control mode of operation to the peak current control mode of operation in response to a surge in load current drawn by one or more of electronic circuits 120, 130, and 140.

Referring to FIG. 5, at operation 540, a transient current of the voltage regulator circuit is monitored during the peak current control mode of operation. Referring to FIG. 2, comparator circuit 235 compares the current level at input 237 ($I_{LIM}$) to the current level at input 236 ($I_{IND}$) during the peak current control mode of operation.

Referring to FIG. 5, at operation 550, in response to the transient current reaching an upper value of a limit current, the voltage regulator circuit transitions from the peak current control mode of operation to the valley current control mode of operation. Referring to FIG. 2, if inductor current 217 reaches the upper value of $I_{LIM}$, comparator circuit 235 indicates to control circuit 239, via control signal line 238, to transition voltage regulator circuits 210$_0$-210$_N$ from the peak current control mode of operation to the valley current control mode of operation. In response to receiving the indication that inductor current 217 reached the upper value of $I_{LIM}$, control circuit 239 sends a disable "peak current mode" signal to voltage regulator circuits 210$_0$-210$_N$ via control signal line 250. In some embodiments, when the peak current mode signal is disabled, all of voltage regulator circuits 210$_0$-210$_N$ transition from the peak current control mode of operation to the valley current control mode of operation.

Referring to FIGS. 2 and 3, at time $t_3$, upper value 350 of $I_{LIM}$ can be set to a predetermined current level 360 below a maximum current level 370 provided by voltage regulator circuits 210$_0$-210$_N$ at a particular voltage level of supply voltage 115 ($V_{LOAD}$) to prevent damage to power management system 110 (e.g., to protect one or more of first switching transistors 212, second switching transistors 214, and inductors 216). Once inductor currents 217 (as represented by waveform 320) reaches upper value 350 of $I_{LIM}$, voltage regulator circuits 210$_0$-210$_N$ transition from the peak current control mode of operation to the valley current control mode of operation.

Referring to FIG. 5, at operation 560, the voltage regulator circuit operates in the valley current control mode of operation to provide a second steady state current, after the transient current reaches the upper value of the limit current. Referring to FIGS. 2 and 3, as shown by the cyclic nature of first switching transistors 212 and second switching transistors 214 in waveform 320 after time $t_3$, voltage regulator circuits 210$_0$-210$_N$ operate in the valley current control mode of operation and provide the second steady state current. In turn, referring to FIG. 4, supply voltage 115 (as shown by waveform 410) reaches a steady state voltage level after time $t_3$.

This disclosure describes aspects of a power management system with voltage undershoot compensation. In some embodiments, the power management system (e.g., power management system 110) can include a voltage regulator circuit (e.g., voltage regulator circuit 210) and a current control detection circuit (e.g., current control detection circuit 230). The current control detection circuit can set the voltage regulator circuit in a valley current control mode of operation during a first steady state current (e.g., time period from time to $t_0$ time $t_1$ in FIG. 3) drawn by one of more electronic circuits (e.g., one or more electronic circuits 120, 130, and 140) coupled to the voltage regulator circuit. The current control detection circuit can also set the voltage regulator circuit in a peak current control mode of operation during a transient current (e.g., time period from time $t_2$ to time $t_3$ in FIG. 3) between the first steady state current and a second steady state current drawn by the one or more electronic circuits (e.g., a higher steady state current than the first steady state current), in response to a load voltage provided by the voltage regulator circuit falling below a predetermined voltage level (e.g., falling below [$V_{TAR}$−$V_{PRE}$]). The current control detection circuit can further set the voltage regulator circuit in the valley current control mode of operation after the second steady state current has been reached (e.g., time period after time $t_3$ in FIG. 3). A benefit of operating the voltage regulator circuit in the peak current control mode of operation during the transient current, among others, is that a voltage undershoot at an output of the voltage regulator circuit (e.g., (e.g., $V_{UNDERSHOOT}$ in FIG. 4)—e.g., due to a surge in load current by the one or more electronic circuits—can be mitigated (or compensated for), thus allowing the power management system to reach a steady state mode of operation more quickly.

Figure 6:
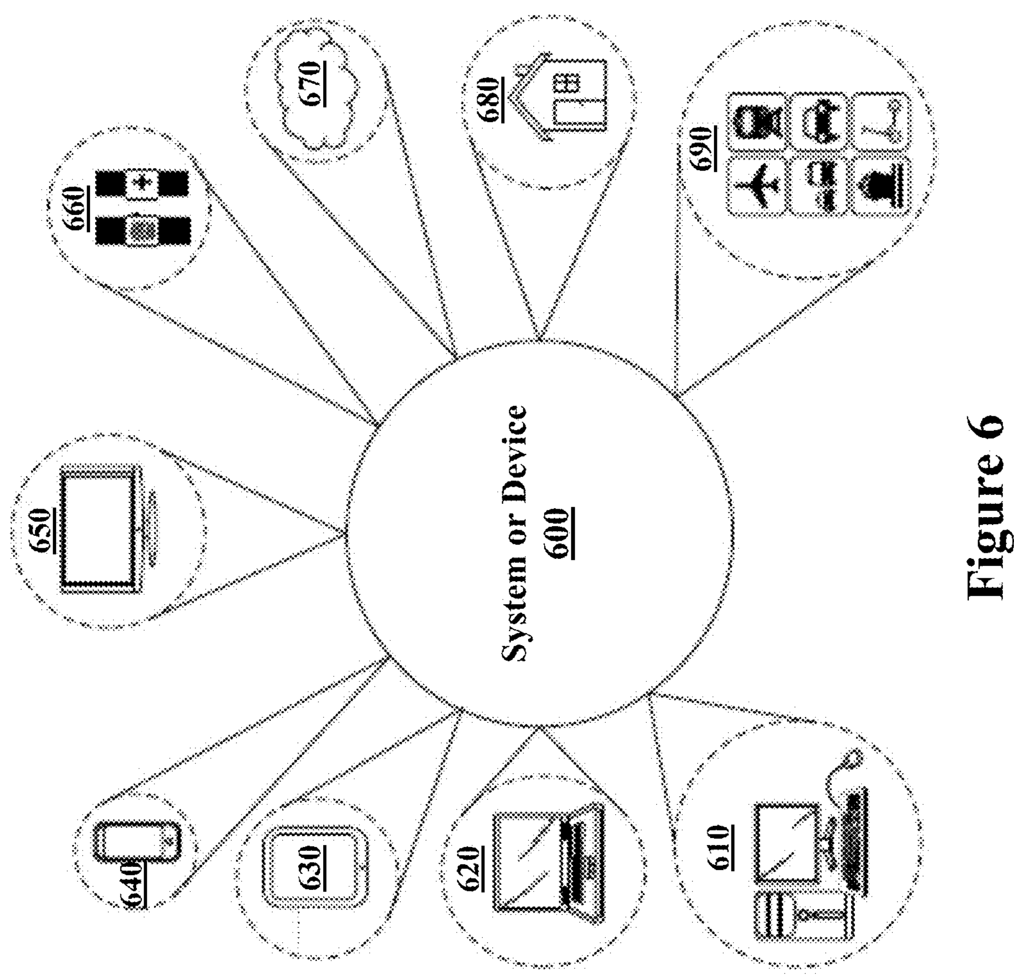
FIG. 6 is an illustration of various exemplary systems or devices that can include the disclosed embodiments.

FIG. 6 is an illustration of exemplary systems or devices that can include the disclosed embodiments. System or device 600 can incorporate one or more of the disclosed embodiments in a wide range of areas. For example, system or device 600 can be implemented in one or more of a desktop computer 610, a laptop computer 620, a tablet computer 630, a cellular or mobile phone 640, and a television 650 (or a set-top box in communication with a television).

Also, system or device 600 can be implemented in a wearable device 660, such as a smartwatch or a health-monitoring device. In some embodiments, the smartwatch can have different functions, such as access to email, cellular service, and calendar functions. Wearable device 660 can also perform health-monitoring functions, such as monitoring a user's vital signs and performing epidemiological functions (e.g., contact tracing and providing communication to an emergency medical service). Wearable device 660 can be worn on a user's neck, implantable in user's body, glasses or a helmet designed to provide computer-generated reality experiences (e.g., augmented and/or virtual reality), any other suitable wearable device, and combinations thereof.

Further, system or device 600 can be implemented in a server computer system, such as a dedicated server or on shared hardware that implements a cloud-based service 670. System or device 600 can be implemented in other electronic devices, such as a home electronic device 680 that includes a refrigerator, a thermostat, a security camera, and other suitable home electronic devices. The interconnection of such devices can be referred to as the "Internet of Things" (IoT). System or device 600 can also be implemented in various modes of transportation 690, such as part of a vehicle's control system, guidance system, and/or entertainment system.

The systems and devices illustrated in FIG. 6 are merely examples and are not intended to limit future applications of the disclosed embodiments. Other example systems and devices that can implement the disclosed embodiments include portable gaming devices, music players, data storage devices, and unmanned aerial vehicles.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A power management system, comprising:

a voltage regulator circuit; and a detection circuit configured to:

set the voltage regulator circuit in a valley current control mode of operation during a first steady state current drawn by one or more electronic circuits coupled to the voltage regulator circuit;

set the voltage regulator circuit in a peak current control mode of operation during a transient current between the first steady state current and a second steady state current drawn by the one or more electronic circuits, in response to a load voltage provided by the voltage regulator circuit falling below a predetermined voltage level; and set the voltage regulator circuit in the valley current control mode of operation after the second steady state current has been reached.

2. The power management system of claim 1, further comprising:

a current detection circuit coupled to an output of the voltage regulator circuit and configured to monitor the first and second steady state currents and the load voltage.

3. The power management system of claim 1, wherein the voltage regulator circuit comprises a DC-DC converter having an inductor, and wherein the detection circuit is further configured to send a control signal to the voltage regulator circuit to transition the voltage regulator circuit from the peak current control mode of operation to the valley current control mode of operation, in response to a current flowing through the inductor reaching an upper value of a limit current.

4. The power management system of claim 3, wherein the limit current is at a fixed current level during the valley current control mode of operation.

5. The power management system of claim 3, wherein the limit current increases as the transient current increases during the peak current control mode of operation.

6. The power management system of claim 3, wherein the limit current is at a fixed current level after the second steady state current has been reached.

7. The power management system of claim 1, wherein the voltage regulator circuit comprises:

a first switching transistor;

a second switching transistor;

an inductor with a first terminal and a second terminal, wherein the first terminal is electrically connected to the first and second switching transistors and the second terminal is electrically connected to the one or more electronic circuits; and a control circuit coupled to the detection circuit and configured to activate and deactivate the first and second switching transistors during the valley current control mode of operation and the peak current control mode of operation.

8. The power management system of claim 7, wherein the control circuit is further configured to:

activate and deactivate the first and second switching transistors at a substantially constant frequency during the valley current control mode of operation; and deactivate the second switching transistor and pass a power supply source to the one or more electronic circuits through the first switching transistor during the peak current control mode of operation.

9. A device, comprising:

one or more electronic circuits; and a power management system coupled to the one or more electronic circuits and comprising:

a plurality of voltage regulator circuits; and a current control detection circuit configured to:

set the plurality of voltage regulator circuits in a valley current control mode of operation during a first steady state current drawn by the one or more electronic circuits, wherein the plurality of voltage regulator circuits operate at a substantially constant switching frequency and are phased to be active at spaced intervals during the valley current control mode of operation;

set the plurality of voltage regulator circuits in a peak current control mode of operation during a transient current between the first steady state current and a second steady state current drawn by the one or more electronic circuits, in response to a load voltage provided by the plurality of voltage regulator circuits falling below a predetermined voltage level, wherein the plurality of voltage regulator circuits pass a power supply source to the one or more electronic circuits during the peak current control mode of operation; and set the plurality of voltage regulator circuits in the valley current control mode of operation after the second steady state current has been reached, wherein the plurality of voltage regulator circuits operate at the substantially constant switching frequency and are phased to be active at the spaced intervals during the valley current control mode of operation.

10. The device of claim 9, wherein the power management system further comprises a current detection circuit coupled to outputs of the plurality of voltage regulator circuits and configured to monitor the first and second steady state currents and the load voltage.

11. The device of claim 9, wherein each of the plurality of voltage regulator circuits comprises a DC-DC converter having an inductor, and wherein the current control detection circuit is further configured to send a control signal to the plurality of voltage regulator circuits to transition the plurality of voltage regulator circuits from the peak current control mode of operation to the valley current control mode of operation, in response to a current flowing through the inductors reaching an upper value of a limit current.

12. The device of claim 11, wherein the limit current is at a fixed current level during the valley current control mode of operation.

13. The device of claim 11, wherein the limit current increases as the transient current increases during the peak current control mode of operation.

14. The device of claim 11, wherein the limit current is at a fixed current level after the second steady state current has been reached.

15. The device of claim 9, wherein each of the plurality of voltage regulator circuits comprises:

a first switching transistor;

a second switching transistor;

an inductor with a first terminal and a second terminal, wherein the first terminal is electrically connected to the first and second switching transistors and the second terminal is electrically connected to the one or more electronic circuits; and a switch controller coupled to the current control detection circuit and configured to activate and deactivate the first and second switching transistors during the valley current control mode of operation and the peak current control mode of operation.

16. The device of claim 15, wherein the switch controller is further configured to:

activate and deactivate the first and second switching transistors at a substantially constant frequency during the valley current control mode of operation; and deactivate the second switching transistor and pass the power supply source to the one or more electronic circuits through the first switching transistor during the peak current control mode of operation.

17. A method, comprising:

monitoring an output voltage of a voltage regulator circuit to determine whether the output voltage falls below a predetermined voltage level due to a load current drawn by one or more electronic circuits coupled to the voltage regulator circuit;

in response to the output voltage falling below the predetermined voltage level, transitioning the voltage regulator circuit from a valley current control mode of operation to a peak current control mode of operation;

monitoring a transient current of the voltage regulator circuit during the peak current control mode of operation; and in response to the transient current reaching an upper value of a limit current, transitioning the voltage regulator circuit from the peak current control mode of operation to the valley current control mode of operation.

18. The method of claim 17, further comprising:

operating the voltage regulator circuit in the valley current control mode of operation to provide a first steady state current, in response to the output voltage staying above the predetermined voltage level; and operating the voltage regulator circuit in the valley current control mode of operation to provide a second steady state current, after the transient current reaches the upper value of the limit current.

19. The method of claim 18, wherein operating the voltage regulator circuit in the valley current control mode of operating to provide the first and second state currents comprises setting the limit current to a fixed current level.

20. The method of claim 17, wherein transitioning the voltage regulator circuit from the valley current control mode of operation to the peak current control mode of operation comprises increasing the limit current as the transient current increases until the upper value of the limit current is reached.

* * * * *